(12) United States Patent
Alcorn

(10) Patent No.: US 6,853,380 B2
(45) Date of Patent: Feb. 8, 2005

(54) GRAPHICAL DISPLAY SYSTEM AND METHOD

(75) Inventor: Byron A. Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 10/087,754

(22) Filed: Mar. 4, 2002

(65) Prior Publication Data

US 2003/0164832 A1 Sep. 4, 2003

(51) Int. Cl.$^7$ .................................................. G06T 1/20
(52) U.S. Cl. ...................... 345/506; 345/502; 345/505
(58) Field of Search ................................ 345/501, 502, 345/503, 504, 505, 506; 712/28, 31

(56) References Cited

U.S. PATENT DOCUMENTS

| | | | |
|---|---|---|---|
| 5,321,808 A | 6/1994 | Rupp | 395/164 |
| 5,408,602 A | 4/1995 | Giokas | 395/157 |
| 5,546,530 A * | 8/1996 | Grimaud et al. | 345/505 |
| 5,757,321 A | 5/1998 | Billyard | 345/434 |
| 5,767,867 A | 6/1998 | Hu | 345/524 |
| 5,794,016 A * | 8/1998 | Kelleher | 345/505 |
| 5,844,553 A | 12/1998 | Hao et al. | 345/329 |
| 5,949,423 A | 9/1999 | Olsen | 345/422 |
| 6,005,572 A | 12/1999 | Kurihara | 345/340 |
| 6,215,486 B1 | 4/2001 | Walls et al. | 345/329 |
| 6,222,550 B1 | 4/2001 | Rosman et al. | 345/419 |
| 6,249,294 B1 | 6/2001 | Lefebvre et al. | 345/504 |
| 6,271,851 B1 | 8/2001 | Hsiao et al. | 345/422 |
| 6,459,429 B1 * | 10/2002 | Deering | 345/423 |
| 6,529,198 B1 * | 3/2003 | Miyauchi | 345/505 |
| 6,727,904 B2 * | 4/2004 | Walls et al. | 345/506 |

OTHER PUBLICATIONS

"Understanding X Features: Distributed Single Logical Screen" http://www.hp.com/xwindow/sharedInfo/Whitepapers/Slsd/slsd.html, 1998, pp. 1–10.

Lefebvre, Kevin "Hewlett–Packard's Large Screen Multi––Display Technology: An Exploration of the Architecture Behind HP's New Immersive Visualization Solutions" http://www.hp.com; xwindow/sharedInfo/Whitepapers/Sls3d/sls_3d.html; 1998, pp. 1–9.

"Understanding X Features: Multiple Display Technologies" http://www.hp.com/xwindow/sharedInfo/Whitepapers/Sls/sls.html, 1997, pp. 1–13.

* cited by examiner

Primary Examiner—Matthew C. Bella
Assistant Examiner—Mackly Monestime

(57) ABSTRACT

A graphical display system utilizes a plurality of graphics pipelines, a compositor, and application interface logic. The plurality of graphics pipelines are configured to render graphical data in parallel. The compositor is configured to define a composite data signal that is based on the graphical data rendered by each of the pipelines. The application interface logic is configured to retrieve configuration data indicative of a configuration of the compositor. The application interface logic is further configured to provide the configuration data to a graphics application, wherein the graphics application is configured to provide graphical data to the plurality of pipelines based on the configuration data.

23 Claims, 11 Drawing Sheets

GRAPHICAL DISPLAY SYSTEM AND METHOD

BACKGROUND OF THE INVENTION

1. Field of the Invention

The present invention generally relates to graphical rendering and display techniques and, in particular, to a graphical display system and method.

2. Related Art

Computer graphical display systems are commonly used for displaying graphical representations of two-dimensional and/or three-dimensional objects on a two-dimensional display device, such as a cathode ray tube, for example. In this regard, a computer graphical display system normally includes one or more graphics applications having graphical data that defines one or more graphical objects. When a graphical object is to be displayed, the graphics application submits a command or a set of commands, referred to hereafter as a "drawing command," for drawing the object. The drawing command includes or is associated with graphical data that defines the color value and possibly other attributes for each pixel of the object.

In response to the drawing command, a graphics pipeline within the graphical display system renders the command's graphical data to a frame buffer. The data within the frame buffer defines the display attributes (e.g., color) for each pixel of a display device, which periodically reads the frame buffer and colors each pixel displayed by the display device according to each pixel's corresponding color value in the frame buffer. Moreover, by rendering the graphical data of the drawing command to the frame buffer, the image displayed by the output device is eventually updated to include an image of the object defined by the graphical data of the drawing command.

Higher quality images are often defined by larger amounts of graphical data. However, increasing the amount of graphical data defining an image to be displayed by a typical graphical display system generally increases the amount time required for the graphical display system to render the graphical data. Thus, a trade-off between image quality and rendering speed often exists, and the overall rendering speed of a typical graphical display system is often a limiting factor in the types of images rendered by the graphical display system.

SUMMARY OF THE INVENTION

A graphical display system in accordance with an exemplary embodiment of the present invention utilizes a plurality of graphics pipelines, a compositor, and application interface logic. The plurality of graphics pipelines are configured to render graphical data in parallel. The compositor is configured to define a composite data signal that is based on the graphical data rendered by each of the pipelines. The application interface logic is configured to retrieve configuration data indicative of a configuration of the compositor. The application interface logic is further configured to provide the configuration data to a graphics application, wherein the graphics application is configured to provide graphical data to the plurality of pipelines based on the configuration data.

A graphical display method in accordance with an exemplary embodiment of the present invention can be broadly conceptualized by the following steps: providing graphical data from a graphics application to a plurality of graphics pipelines, rendering the graphical data in parallel, via the plurality of graphics pipelines, utilizing a compositor to form a composite data signal based on the graphical data rendered by each of the plurality of pipelines, retrieving configuration data indicative of a configuration of the compositor, and adapting operation of the graphics application based on the configuration data.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
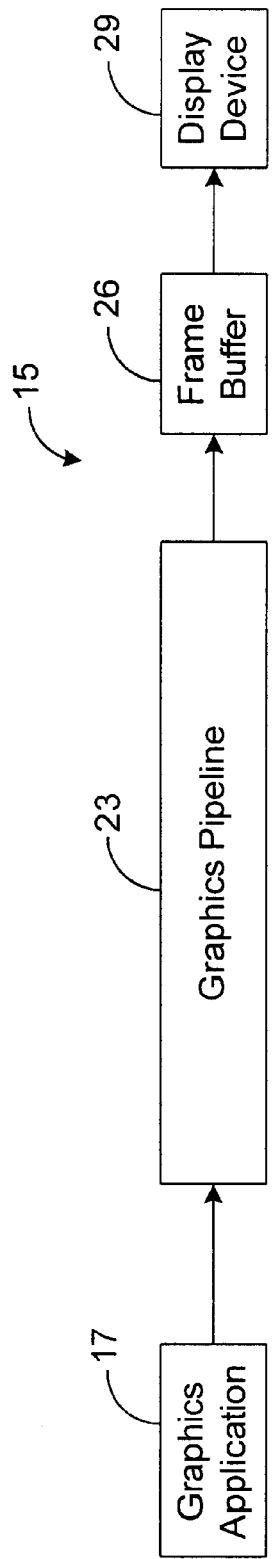
FIG. 1 is a block diagram illustrating a conventional graphical display system.

FIG. 1 depicts an exemplary embodiment of a conventional computer graphical display system 15. A graphics application 17 defines, in data, various objects that may be rendered and displayed by the system 15. To display an object, the application 17 transmits a graphics command having graphical data that defines the object to a graphics pipeline 23, which may be implemented in hardware, software, or any combination thereof. The graphics pipeline 23 receives the graphical data from the application 17 and, through well-known techniques, renders the graphical data to a frame buffer 26.

In general, the frame buffer 26 stores graphical data defining an image that is to be displayed by a display device 29. In this regard, the frame buffer 26 includes a set of data for each pixel displayed by the display device 29. Each set of data is correlated with coordinate values that identify one of the pixels displayed by the display device 29, and each set of data includes the color value of the identified pixel, as well as any additional information needed to appropriately color or shade the identified pixel.

By employing a plurality of graphics pipelines, it is possible to increase rendering speed and/or image quality. For example, commonly-assigned U.S. patent application Ser. No. 09/715,335, entitled "System and Method for Efficiently Rendering Graphical Data," which is incorporated herein by reference, generally describes a graphical display system having multiple pipelines for rendering graphical data from a graphics application. In one embodiment described by the foregoing patent application, a master computer passes a copy of each three-dimensional (3D) graphics command to a plurality of pipelines, which render the 3D graphics commands in parallel. By having each of a plurality of pipelines render at least a portion of the graphical data associated with the 3D graphics command, the overall rendering speed of the graphical display system can be increased, and/or the image quality of the graphical display system can be efficiently increased via techniques such as jitter enhancement and/or anti-aliasing.

Note that, by having a master processor distribute each 3D graphics command to the plurality of pipelines, the use of multiple pipelines to render graphical data can be transparent to the graphics application. Thus, conventional graphics applications 17 designed to operate on the system 15 depicted in FIG. 1 can be utilized in the graphical display system described by the foregoing patent application.

However, transparently passing a copy of each 3D graphics command to a plurality of pipelines for rendering may not always be the best methodology for rendering graphical data from a graphics application. For example, when graphical objects are defined by a relatively large amount of graphical data, significant delays may occur due to the passing of multiple copies of the same graphics command to different pipelines. Some of these delays are needless in that one or more of the graphics pipelines may never actually render at least some of the graphical data in each graphics command.

In such situations, it may be more desirable for the graphics application to allocate portions of the graphical data to different pipelines and to then pass, to each pipeline, only graphical data that is allocated to the pipeline. In essence, the graphics application passes different commands and different graphical data to the different pipelines so that the overall graphical display system can operate more efficiently. A preferred embodiment of such a graphical display system 50 is depicted in FIG. 2.

Figure 2:
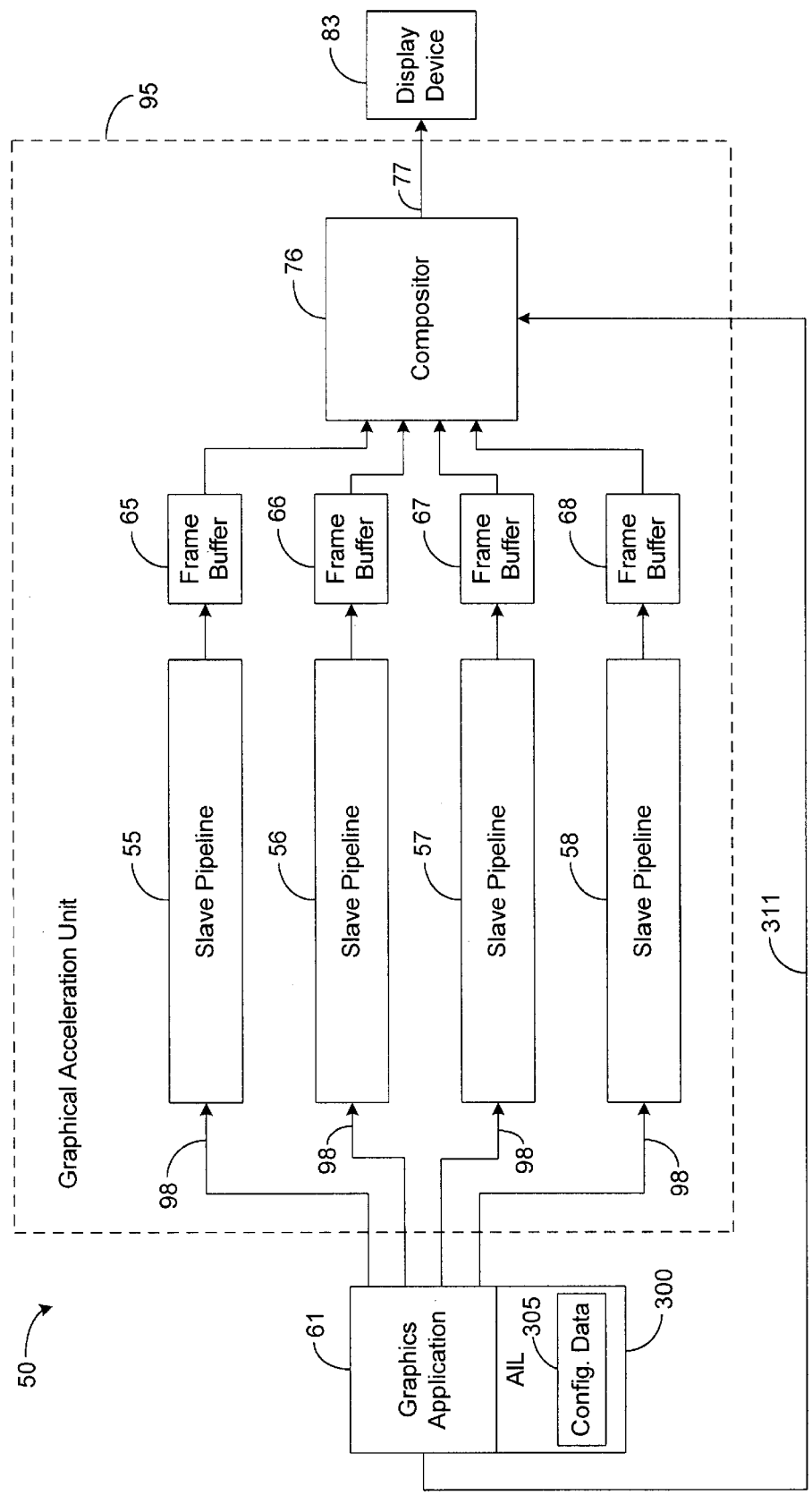
FIG. 2 is a block diagram illustrating a graphical display system in accordance with an exemplary embodiment of the present invention.

As shown by FIG. 2 the graphical display system 50 has multiple pipelines 55–58 for rendering graphics commands from a graphics application 61. The graphics pipelines 55–58 may be implemented via hardware, software or any combination thereof. It should be noted that the embodiment shown by FIG. 2 depicts four graphics pipelines 55–58 for illustrative purposes only, and other numbers (i.e., two or more) of graphics pipelines 55–58 may be employed to implement the system 50 in other embodiments.

As will be described in more detail hereafter, the graphics application 61 receives configuration data 305 from application interface logic (AIL) 300 and, based on this data 305, provides graphical data to each of the graphics pipeline 55–58, which respectively render the graphical data to frame buffers 65–68. Each frame buffer 65–68 buffers the graphical data rendered to it and outputs the graphical data to a compositor 76, which may be implemented in software, hardware, or any combination thereof. The compositor 76, which will be described in more detail hereafter, is configured to provide, to a display device 83 (e.g., a cathode ray tube), a composite data signal 77 based on the graphical data from the frame buffers 65–68. The graphical data provided to the display device 83 via the composite data signal 77 is received by the display device 83, which displays images defined by the composite data signal 77. Note that the pipelines 55–58, the frame buffers 65–68, and the compositor 76 will be collectively referred to as a graphical acceleration unit 95.

In some situations, it may be desirable to distribute some of the graphics pipelines 55–58 across multiple computers. In this regard, by distributing the graphics pipelines 55–58 across multiple computers, it is possible to divide the processing burden associated with the rendering performed by the pipelines 55–58 across the multiple computers rather than having a single computer bear the entire processing burden alone. For illustrative purposes, assume that, in the embodiment shown by FIG. 2, each of the graphics pipelines 55–58 is implemented via a different computer. However, it should be noted that, in other embodiments, multiple ones of the graphics pipelines 55–58 could be implemented via the same computer, if desired.

When the graphics pipelines 55–58 are implemented via different computers, it may be desirable to utilize a network, such as a local area network (LAN), for example, to enable communication with the pipelines 55–58. Indeed, in the exemplary embodiment shown by FIG. 2, a LAN 98 is utilized to interface the graphics application 61 with each of the pipelines 55–58, which preferably reside on different computers as described above.

Figure 3:
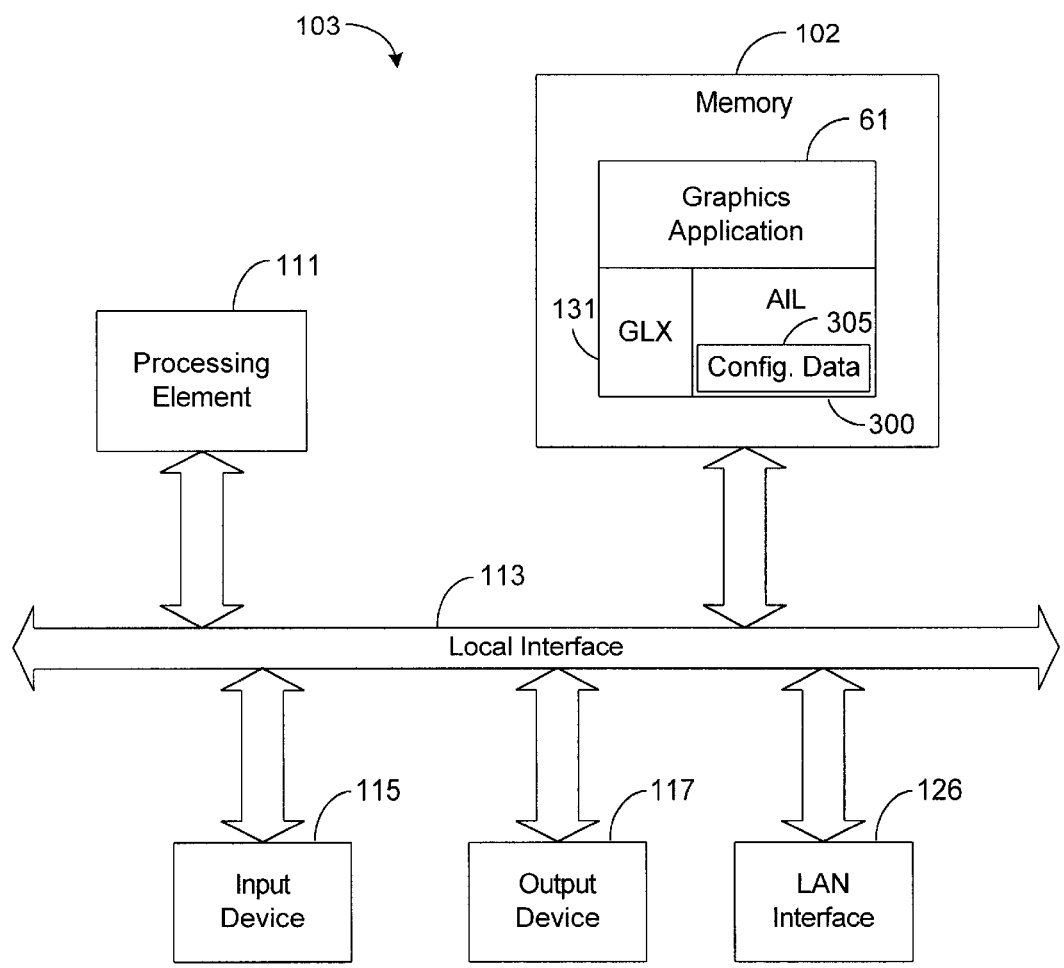
FIG. 3 is a block diagram illustrating a computer that may be utilized to implement a graphics application such as is depicted in FIG. 2.

FIG. 3 depicts a block diagram of a computer 103, referred to hereafter as "host computer," that may be utilized to run the graphics application 61 in the preferred embodiment. As can be seen by referring to FIG. 3, the host computer 103 preferably stores the graphics application 61 in memory 102. Through conventional techniques, the application 61 is executed via one or more conventional processing elements 111, such as a central processing unit (CPU), for example, which communicate to and drive the other elements within the host computer 103 via a local interface 113, which can include one or more buses. Furthermore, an input device 115, for example, a keyboard or a mouse, can be used to input data from a user of the host computer 103, and an output device 117, for example, a display device or a printer, can be used to output data to the user. The host computer 103 preferably includes a LAN interface 126 that allows the host computer 103 to exchange data with the LAN 98 (FIG. 2).

Various types of network protocols may be employed to process the graphical data received from the graphics application 61. In the exemplary embodiment of the system 50 described herein, X Protocol is preferably utilized to render two-dimensional (2D) graphical data, and an extension of X Protocol, referred to as "OpenGL (OGL) Protocol," is preferably utilized to render three-dimensional (3D) graphical data, although other types of protocols may be utilized in other embodiments.

By way of background, OGL Protocol is a standard application programming interface (API) to hardware that accelerates 3D graphics operations. Although OGL Protocol is designed to be window system independent, it is often used with window systems, such as the X Window System, for example. In order that OGL Protocol may be used in an X Window System environment, an extension of the X Window System has been developed called "GLX." For more complete information on the GLX extension to the X Window System and on how OGL Protocol can be integrated with the X Window System, see for example Mark J. Kilgard, *OpenGL Programming for the X Window System* (Addison-Wesley Developers Press 1996), which is incorporated herein by reference. Also see commonly-assigned U.S. Pat. No. 6,249,294, entitled "3D Graphics in a Single Logical Screen Display Using Multiple Remote Computer Systems," which is incorporated herein by reference as well.

The host computer 103 preferably includes a GLX layer 131 that can be implemented in software, hardware, or any combination thereof. In the embodiment shown by FIG. 3, the GLX layer 131 is implemented in software and translates each graphics command issued by the graphics application 61 into one or more X Protocol commands for performing the functionality commanded by the issued command. In the preferred embodiment, each X Protocol command is communicated to one or more graphics pipelines 55–58 via LAN interface 126 and LAN 98.

Figure 4:
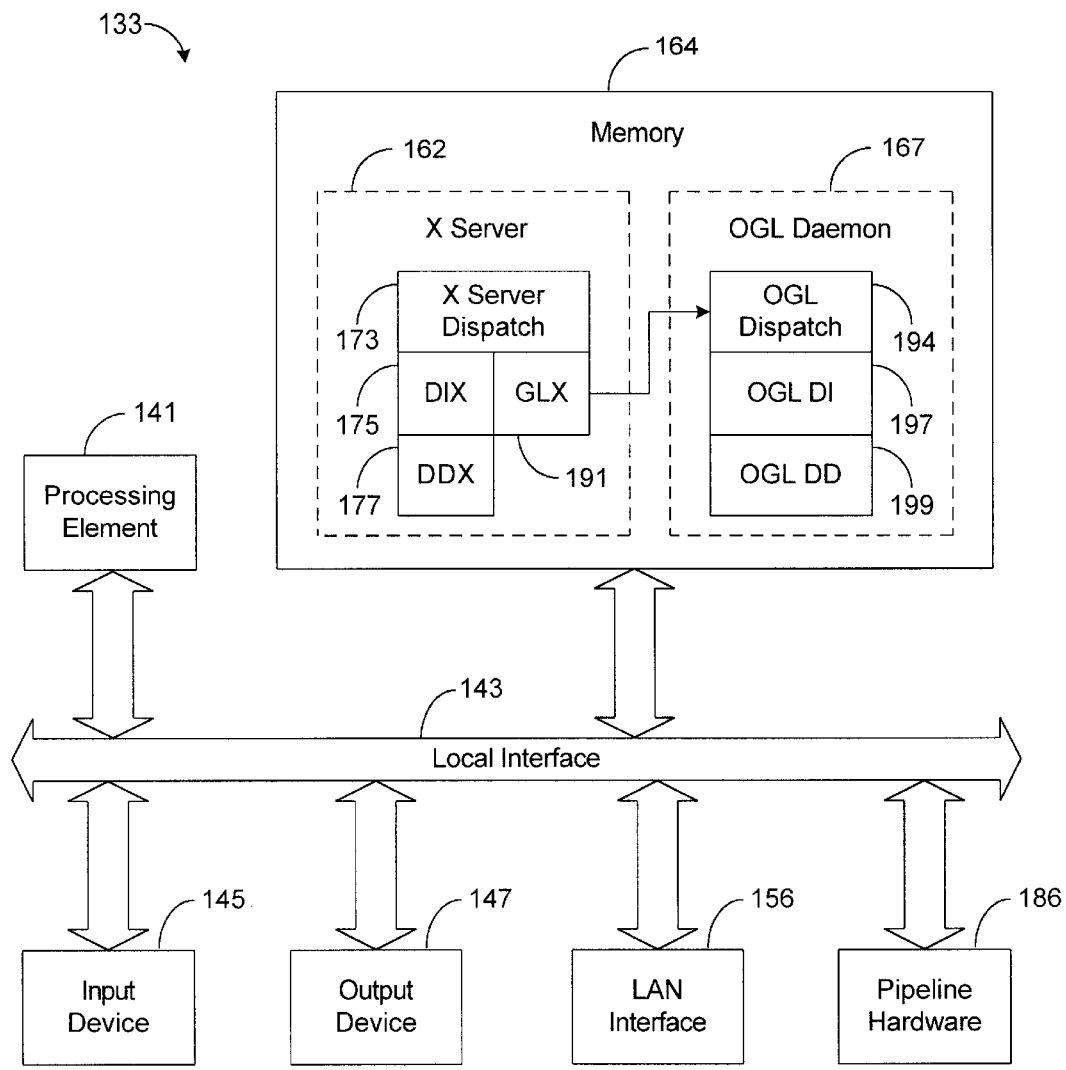
FIG. 4 is a block diagram illustrating a computer that may be utilized to implement a graphics pipeline such as is depicted in FIG. 2.

FIG. 4 depicts a block diagram of a computer 133 that may be utilized to implement one of the graphics pipelines 55–58 in the preferred embodiment. As shown by FIG. 4, the computer 133 preferably includes one or more processing elements 141, such as a central processing unit, for example, that communicate to and drive the other elements within the computer 133 via a local interface 143, which can include one or more buses. Furthermore, an input device 145, for example, a keyboard or a mouse, can be used to input data from a user of the computer 133, and an output device 147, for example, a display device or a printer, can be used to output data to the user. The computer 133 may be connected to a LAN interface 156 that allows the computer 133 to exchange data with the LAN 98.

The computer 133 of the preferred embodiment also comprises an X server 162. The X server 162 may be implemented in software, hardware, or any combination thereof, and in the embodiment shown by FIG. 4, the X server 162 is implemented in software and stored in memory 164. In the preferred embodiment, the X server 162 renders two-dimensional (2D) graphical data and routes three-dimensional (3D) graphical data to an OpenGL (OGL) daemon 167. Note that the OGL daemon 167 may be implemented in software, hardware, or any combination thereof, and in the embodiment depicted by FIG. 4, the OGL daemon 167 is also implemented in software and stored within memory 164.

Moreover, an X server dispatch layer 173 is designed to route 2D graphical data of a received command to a device-independent (DIX) layer 175. The DIX layer 175 and a device-dependent (DDX) layer 179 are configured to process the 2D data and to accelerate or drive the 2D data through pipeline hardware 186 to the pipeline's associated frame buffer 65–68 (FIG. 2). The X server dispatch layer 173 is further designed to route 3D graphical data of a received command to a GLX layer 191, which interfaces the 3D graphical data with the an OGL dispatch layer 194 of the OGL daemon 167. The OGL dispatch layer 194 interfaces this data with an OGL device-independent (DI) layer 197. The OGL DI layer 197 and an OGL device-dependent (DD) layer 227 are configured to process the 3D data and to accelerate or drive the 3D data through pipeline hardware 186 to the pipeline's associated frame buffer 65–68 (FIG. 2). Thus, the 2D graphical data of a received command is processed or accelerated by the X server 162, and the 3D graphical data of the received command is processed or accelerated by the OGL daemon 167. Note that logic for implementing a graphics pipeline 55–58 shown by FIG. 2 generally resides within the X server 162, the OGL daemon 167, and the pipeline hardware 186 of FIG. 4.

As set forth above, the compositor 76 (FIG. 2) is configured to form a composite data signal 77 that is based on graphical data from the frame buffers 65–68. The composite data signal 77 defines the color values for the pixels displayed by the display device 83, and the display device 83 updates its displayed image based on the color values received from the composite data signal 77. Exemplary techniques that may be utilized by the compositor 76 to process the graphical data from the frame buffers 65–68 and to form the composite data signal 77 will be generally described in more detail hereafter.

In a first example, the additional processing power provided by the multiple pipelines 55–58 may be utilized to increase the rendering speed of the system 50. In this regard, the graphics application 61 may be configured to allocate each of the pipelines 55–58 for rendering only a portion of the overall image displayed by the display device 83. As an example, referring to FIG. 5, each of the pipelines 55–58 may be respectively allocated to render portions 215–218 of an overall image 221 displayed by the display device 83. More specifically, the graphics application 61 may allocate the graphics pipeline 55 to render graphical data for portion 215 and may allocate the graphics pipeline 56 to render graphical data for portion 216. Furthermore, the graphics application 61 may allocate the graphics pipeline 57 to render graphical data for portion 217 and may allocate the graphics pipeline 58 to render graphical data for portion 218.

Assume that, in such an example, a new object to be displayed resides only in portions 215–217. To render the new object, the graphics application 61 determines which primitives of the object are to be displayed in portion 215 and provides these primitives to pipeline 55, which renders the primitives to the frame buffer 65. The graphics application 61 also determines which primitives of the object are to be displayed in portion 216 and provides these primitives to pipeline 56, which renders the primitives to the frame buffer 66. In addition, the graphics application 61 determines which primitives of the object are to be displayed in portion 217 and provides these primitives to pipeline 57, which renders the primitives to the frame buffer 67. Note that it is not necessary for the graphics application 61 to provide the same set of primitives to more than one pipeline 55–57. Furthermore, since the object does not reside in the portion 218 allocated to the pipeline 58, it is not necessary for the graphics application 61 to provide any of the foregoing primitives to the pipeline 58.

After the aforementioned primitives have been respectively rendered to frame buffers 65–67, each of the frame buffers 65–67 stores the pixel values for a different portion of the object being rendered. Moreover, the compositor 76 provides the object's pixel values from the frame buffer 65 to the display device 83, which displays the object portion defined by these pixel values in image portion 215, and the compositor 76 provides the object's pixel values from the frame buffers 66 and 67 to the display device 83, which displays the object portions defined by these pixel values in image portions 216 and 217, respectively. As a result, the entire object is displayed by the display device 83 in portions 215–217. The process of displaying an image 221 according to the foregoing techniques shall be generally referred to hereafter as "screen space subdivision."

As illustrated by the foregoing example, the amount of graphical data processed by a graphics pipeline 55–58 can be reduced if the graphics application 61 refrains from providing the pipeline 55–58 graphical data that is outside of the pipeline's allocation. Indeed, in the preceding example, the graphics pipeline 55 is not burdened with processing the primitives that are to be displayed in portions 216 and 217. Similarly, the graphics pipelines 56 and 57 are not burdened with processing primitives outside of their respective allocations, and pipeline 58 is not burdened with processing any of the primitives since all of the primitives are outside of its allocation. As a result, the overall rendering speed of the system 50 is enhanced.

Figure 6:
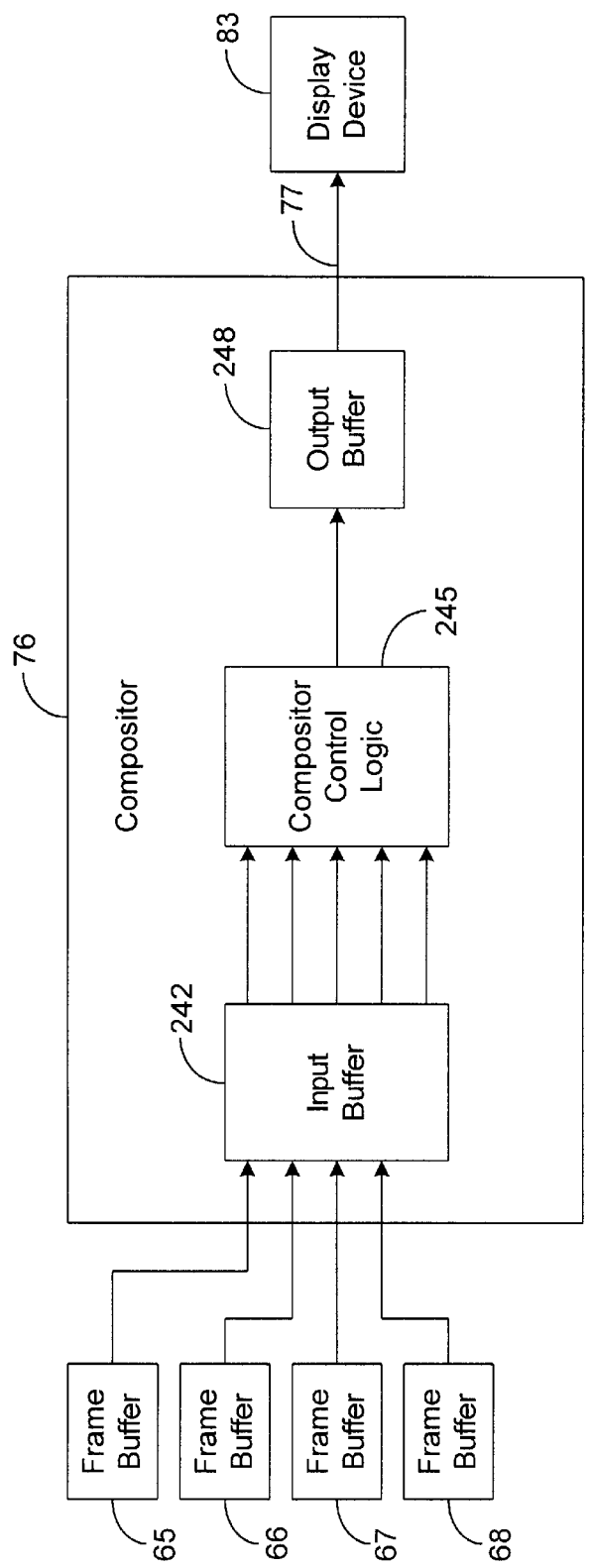
FIG. 6 is a block diagram illustrating a compositor such as is depicted in FIG. 2.

Note that a variety of techniques may be employed by the compositor 76 in forming the composite data signal 77 in the foregoing example. In the preferred embodiment, as shown by FIG. 6, the compositor 76 comprises an input buffer 242 that buffers the graphical data received from the frame buffers 65–68. Based on the buffered data, compositor control logic 245 stores, in an output buffer 248, a color value for each pixel of an image frame to be displayed by the display device 83. The output buffer 248 then outputs the image frame via composite data signal 77, which is utilized by the display device 83 to display the image frame. Note that the compositor control logic 245 can be implemented in hardware, software, or any combination thereof.

To provide a color value for a pixel within image portion 215, the compositor control logic 245 utilizes the graphical data from frame buffer 65. In this regard, the compositor control logic 245 reads, from the graphical data received from frame buffer 65, the color value of the corresponding pixel and writes this color value to the output buffer 248. In a similar fashion, the compositor control logic 245 utilizes the graphical data from frame buffers 66–68 to provide the color values for pixels within image portions 216–218, respectively.

Thus, for each pixel of an image frame stored in the output buffer 248, the compositor control logic 245 is configured to define a color value based on the graphical data stored in one of the frame buffers 65–68, depending on which frame buffer 65–68 has been allocated to the image portion 215–218 that includes the pixel. The compositor control logic 245 then writes this color value to the output buffer 248. Note that various other configurations of the compositor 76 are possible, and the compositor 76 may employ various other techniques in forming the composite data signal 77 based on the graphical data received from each of the frame buffers 65–68.

Figure 5:
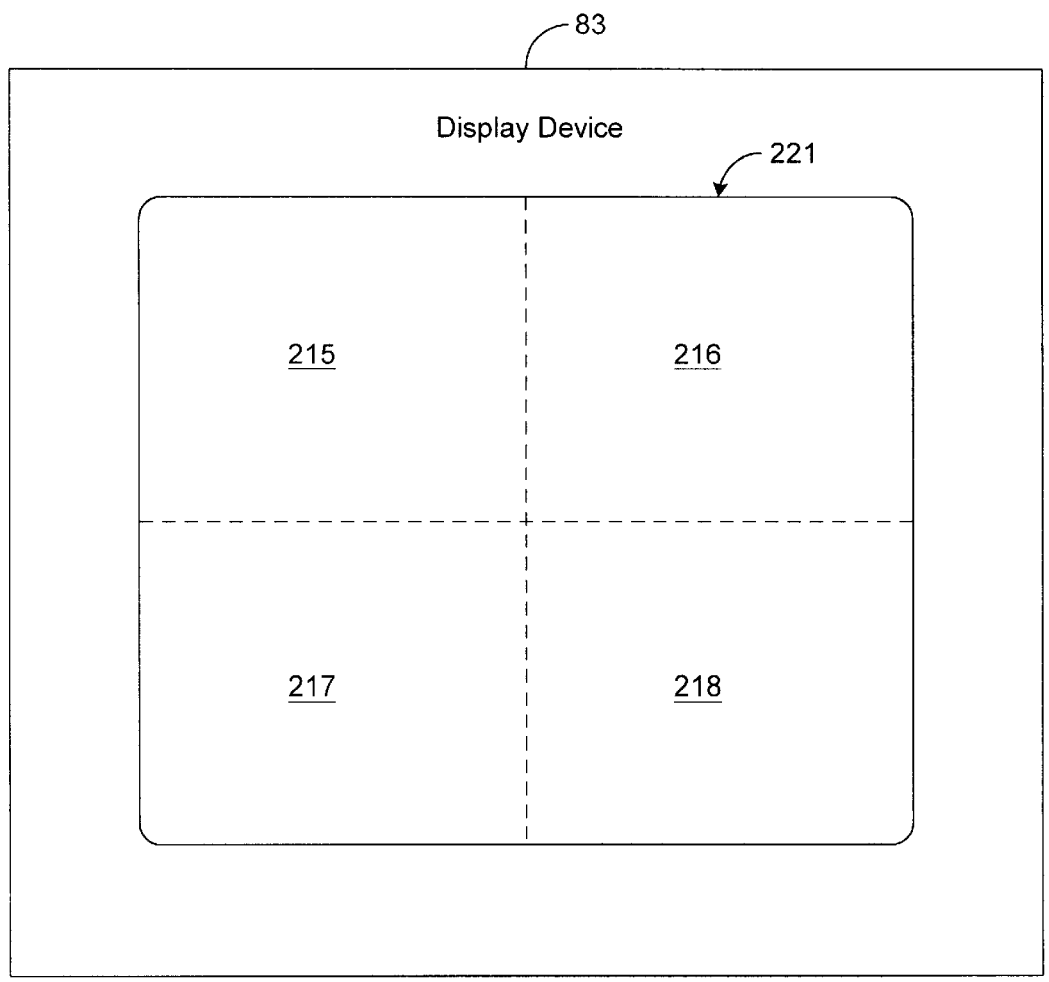
FIG. 5 is a diagram illustrating a display device, such as is depicted in FIG. 2, while the display device is displaying a graphical image.

It should be further noted that it is not necessary for each pipeline 55–58 to be allocated an equal portion 215–218 by the graphics application 61. For example, one of the portions 215–218 may include more objects or more complex objects than other portions 215–218 and/or may be of a smaller size than the other portions 215–218. Indeed, it may be desirable for the graphics application 61 to define the portions 215–218 allocated to the pipelines 55–58 such that each pipeline 55–58 is responsible for rendering substantially the same amount of graphical data during operation. Furthermore, it is not necessary for each of the portions 215–218 to be similarly shaped, and it is possible for the same pipeline 55–58 to be allocated a plurality of non-contiguous portions of the overall image 221 (FIG. 5).

In addition, it is possible for the graphics pipelines 55–58, instead of the graphics application 61, to perform culling. In this regard, the graphics application 61 may communicate, to each of the graphics pipelines 55–58, information indicative of which pipelines 55–58 are allocated or assigned to which image portions 215–218. The graphics pipelines 55–58 may then cull the primitives received from the graphics application 61 such that each pipeline 55–58 only renders primitives within its allocated or assigned image portion 215–218.

In another embodiment, each of the graphics pipelines 55–58 may be allocated a particular portion 215–218 of the overall image 221, as described above. However, before rendering to the frame buffers 66–68, the graphics pipelines 55–58 super-sample the graphical data rendered by the pipelines 55–58. In other words, each of the graphics pipelines 55–58 magnifies the image being rendered by the pipeline 55–58. Then, for each of the frame buffers 65–68, the compositor 76 blends the received graphical data such that the image defined by such data is reduced to its original size (i.e., the image's size before super-sampling).

The compositor 76 then defines each pixel value for the image 221 based on the blended color values according to techniques similar to those described above. In this regard, the compositor control logic 245 reads, from the blended values derived from the graphical data output by the frame buffer 65, to provide the color values for pixels within the image portion 215. In a similar fashion, the compositor control logic 245 utilizes the blended values derived from the graphical data output by the frame buffers 66–68 to provide the color values for pixels within image portions 216–218, respectively. Thus, for each pixel of an image frame stored in the output buffer 248, the compositor control logic 245 is configured to define a color value based on the blended values derived from the graphical data output by one of the frame buffers 65–68, depending on which frame buffer 65–68 has been allocated to the image portion 215–218 that includes the pixel. The compositor control logic 245 then writes this color value to the output buffer 248. By super-sampling and then blending the graphical data rendered by each of the graphics pipelines 55–58, the image displayed by the display device 83 is anti-aliased.

In another embodiment, one or more of the graphics pipelines 55–58 may be allocated the same image portion 215–218 in order to enable certain image enhancement techniques. For example, in one embodiment, each of the pipelines 55–58 may be allocated the entire image 221. Therefore, the same primitives are provided to each of the pipelines 55–58 for rendering, and the graphical data in each of the frame buffers 65–68 define the same image. However, in rendering the graphical data, each of the graphics pipelines 55–58 adds a small offset to the coordinates of each pixel rendered by the pipeline 55–58. The offset applied to the pixel coordinates is preferably different for each different pipeline 55–58.

The compositor 76 then averages the color values for the same pixel coordinates from frame buffers 65–68 to define the pixel color values that are stored in the output frame buffer 248. The display device 83 then displays the averaged color values, thereby displaying a jitter enhanced 3D image.

It should be noted that it is possible to perform jitter enhancement while allocating one or more pipelines to only a portion of the overall image 221 displayed by the display device 83. For example, it is possible to allocate two of the pipelines 55 and 56 to a first portion (e.g., half) of the image 221 and to allocate the other two of the pipelines 57 and 58 to a second portion (e.g., the other half) of the image 221. Then, pipelines 55 and 56 may render the same images, which are averaged by the compositor 76, to perform jitter enhancement on the first portion, and the pipelines 57 and 58 may render the same images, which are averaged by the compositor 76, to perform jitter enhancement on the second portion. It should be noted that other techniques may be employed to exploit the additional processing power provided by the multiple pipelines 55–58 for the purposes of enhancing rendering speed and/or image quality.

It should be further noted that the configuration of the compositor 76 may be different for different graphical acceleration unit 95. For example, the graphics application 61 may be interfaced with a graphical acceleration unit 95 having a compositor 76, such as the one depicted in FIG. 2, capable of receiving and processing graphical data from four graphics pipelines 55–58. However, the graphics application 61 may later be interfaced with another graphical acceleration unit 95 having a compositor 76 capable of receiving and processing graphical data from only three graphics pipelines 55–57. In such a situation, the graphics application 61 preferably allocates different portions of the image 221 that is to be displayed by the display device 83 to only three graphics pipelines 55–57.

Thus, in the preferred embodiment, the graphics application 61 is able to adapt its operation depending on the configuration of the compositor 76 and/or other components of the graphical acceleration unit 95. In this regard, as shown by FIG. 2, the graphics application 61 is preferably interfaced with application interface logic (AIL) 300 that comprises configuration data 305 indicative of the configuration of the graphical acceleration unit 95 and, more particularly, of the compositor 76. As mere examples, the configuration data 305 may indicate the number of pipelines 55–58 that may be utilized by the graphics application 61 to render the image 221 to be displayed by the display device 83 (e.g., the number of frame buffers 65–68 that may simultaneously input rendered graphical data into the compositor 76), or the configuration data 305 may indicate whether the compositor 76 is capable of blending the graphical data received from one or more frame buffers 65–68 for the purposes of performing anti-aliasing and/or jitter enhancement, as described above. The configuration data 305 may also indicate whether the compositor 76 is capable of performing Z-buffering processes and/or alpha-blending, which will be described in more detail hereafter. Note that the configuration data 305 may indicate other types of information pertaining to the configuration or operational capabilities of the graphical acceleration unit 95 and the compositor 76, in particular.

In the preferred embodiment, the application interface logic 300 is configured to retrieve the configuration data 305 and to provide the retrieved configuration data 305 with the graphics application 61 (FIG. 2), as will be described in more detail hereafter. The application interface logic 300 can be implemented in software, hardware, or any combination thereof. As an example, the application interface logic 300 can be implemented in software and stored in the memory 162 (FIG. 3) of a computer 103 utilized to implement the graphics application 61.

When the application interface logic 300 is implemented in software, the configuration data 305 may be stored in the same memory as the software of the logic 300. In alternative embodiments, the configuration data 305 may be stored in memory separate from the application interface logic 300. For example, the configuration data 305 may be stored in a database (not specifically shown), and the application interface logic 300 may be configured to exchange information with the database in order to retrieve the configuration data 305. In another embodiment, which will be described in more detail hereafter, the configuration data 305 may be stored in the compositor 76, and the application interface logic 300 may be configured to exchange data with the compositor 76 to enable the logic 300 to retrieve the configuration data 305. In other embodiments, the configuration data 305 may be stored in other locations accessible by the application interface logic 300.

Figure 7:
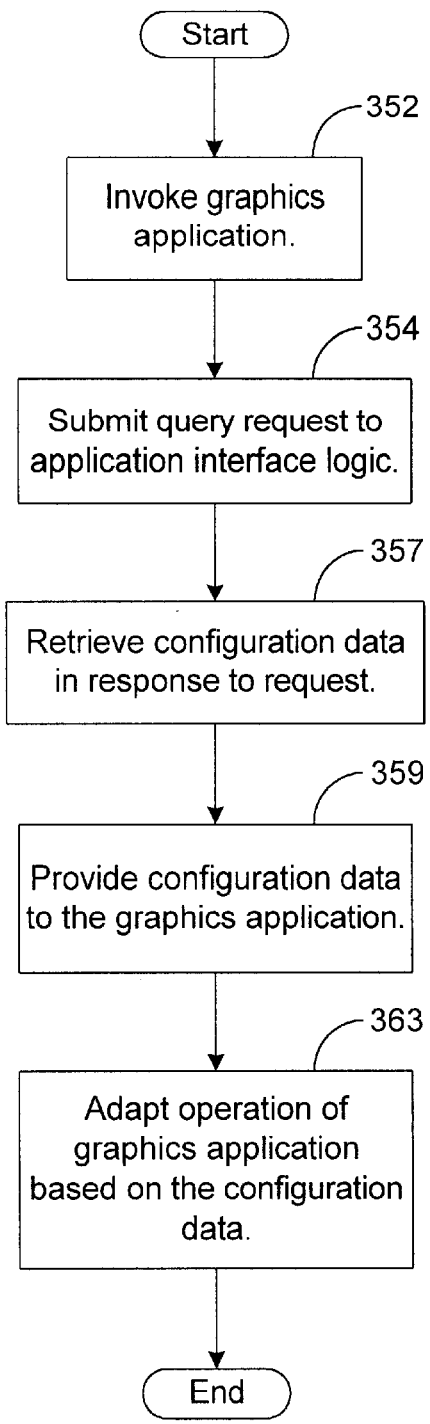
FIG. 7 is a flow chart illustrating an exemplary process for adapting a graphics application based on configuration data that is indicative of a configuration of a compositor such as is depicted in FIG. 2.

When the graphics application 61 is invoked, the application 61 preferably requests the application interface logic 300 to query the configuration of the graphical acceleration unit 95 and, in particular, the compositor 76, as depicted by blocks 352 and 354 of FIG. 7. In response, the application interface logic 300 retrieves the configuration data 305 and provides the configuration data 305 to the application 61, as depicted by blocks 357 and 359 of FIG. 7. The graphics application 61 then adapts its operation to the configuration indicated by the configuration data 305, as depicted by block 363 of FIG. 7.

For example, the configuration data 305 may indicate that the compositor 76 is capable of performing screen space subdivision based on graphical data from four graphics pipelines 55–58. In response, the application 61 may allocate each of the pipelines 55–58 to a different portion 215–218 of the overall image 221 to be displayed by the display device 83. However, if the configuration data 305 indicates that the compositor 76 is capable of blending graphical data for performing jitter enhancement, then the application 61 may allocate a plurality of the pipelines 55–58 to the same portion of the image 221 and instruct the compositor 76 to perform jitter enhancement on the graphical data received from the plurality of pipelines 55–58. Furthermore, if the configuration data 305 indicates that the compositor 76 is capable of blending graphical data for performing anti-aliasing, then the application 61 may instruct the compositor 76 to anti-alias the graphical data received from one or more pipelines 55–58.

In addition, if the configuration data 305 indicates that the compositor 76 is capable of performing Z-buffering processes, the graphics application 61 may be configured to provide depth data according to the Z-buffering capabilities of the compositor 76. As used herein, the term "Z-buffering processes" generally refers to processes, such as culling, that utilize depth values, commonly referred to as "Z-values," for processing or selecting graphical objects. As an example, in some embodiments, one or more of the pipelines 55–58 may be allocated to the same image portion 215–218 (FIG. 5) of the image 221. However, the graphics application 61 may allocate different objects to different pipelines 55–58. As an example, the graphics application 61 may allocate a first object to pipeline 55 and a second object to pipeline 56. In such an example, the graphics application 61 may provide commands for drawing or manipulating the first object only to pipeline 55 and may provide commands for drawing or manipulating the second object only to pipeline 56. Thus, pipelines 56–58 are not burdened with processing graphical data from the first object, and pipelines 55, 57, and 58 are not burdened with processing graphical data from the second object.

However, the first object may occlude the second object. In such an example, the compositor 76 may be configured to perform occlusion culling. In this regard, along with each primitive transmitted to the pipelines 55–58, the graphics application 61 preferably transmits each primitive's Z-value. The pipeline 55–58 rendering the primitive then defines one or more pixels based on the primitive and stores each pixel's color value and Z-value in the pipeline's associated frame buffer 65–68. The compositor 76 then utilizes the Z-values stored in the frame buffers 65–68 to perform occlusion culling.

Moreover, in defining a color value for a particular pixel, which is preferably associated with a particular set of two-dimensional coordinates (x,y), the compositor control logic 245 compares the Z-values, from the frame buffers 65–68, that are also associated with the particular set of two-dimensional coordinates (x,y). The compositor 76 then selects the frame buffer 65–68 having the smallest Z-value for the particular pixel (assuming that a smaller Z-value indicates that the object having the smaller Z-value is closer than an object having a larger Z-value). The compositor 76 then utilizes the color value associated with the particular set of two-dimensional coordinates (x,y) from the selected buffer 65–68 as the particular pixel's color value.

For example, in the previous illustration where a first object defined by graphical data in frame buffer 65 occludes a second object defined by graphical data in frame buffer 66, the compositor 76 preferably culls the second object. In this regard, to define a color value of a pixel shared by the first and second object, the compositor 76 compares the Z-values associated with the pixel in each of the frame buffers 65–68. The Z-value from frame buffer 66 is preferably larger than the Z-value from frame buffer 65, since the first object occludes the second object. Therefore, if there are no objects in the frame buffers 67 and 68 having a smaller Z-value for the pixel, the compositor 76 preferably selects frame buffer 65 and defines the color value of the pixel based on the pixel's color value stored in frame buffer 65. In this regard, the compositor 76 stores, in the output buffer 248, the pixel's color value from frame buffer 65. By implementing the foregoing technique for each of the pixels shared by the first and second object, the compositor 76 effectively culls the second object or, in other words, renders the first object in lieu of the second object.

In the preferred embodiment, the configuration data 305 indicates whether the compositor 76 is capable of processing Z-values for the purposes of performing various Z-buffering processes, such as the culling process described above, for example. Furthermore, if the compositor 76 is capable of performing Z-buffering processes, the configuration data 305 also preferably indicates the maximum Z-value bit length that the compositor 76 is capable of handling. Thus, based on the configuration data 305, the graphics application 61 may determine whether the compositor 76 can perform occlusion culling and, therefore, whether it can allocate the pipelines 55–58 to different objects as described above. Furthermore, the graphics application 61 may scale the Z-values in the graphical data provided to the pipelines 55–58 based on the configuration data 305. In this regard, the graphics application 61 may scale the Z-values such that the largest bit length of a Z-value provided to the pipelines 55–58 does not exceed the maximum Z-value bit length, as indicated by the configuration data 305.

Furthermore, when different objects are allocated to different pipelines 55–58, as described above, it may be desirable for the compositor 76 to perform alpha-blending. In general, alpha-blending is a well-known process to determine pixel color values when a substantially transparent object occludes a substantially opaque object. Furthermore, the configuration data 305 may indicate the types of information utilized by the compositor 76 in performing alpha-blending. Thus, the graphics application 61 may determine, based on the configuration data 305, whether the compositor 76 is capable of performing alpha-blending, and if the compositor 305 is capable of performing alpha-blending, the graphics application 61 may include, in the graphical data provided to the pipelines 55–58, information sufficient for enabling the compositor 76 to perform alpha-blending. This information may then be passed to the compositor 76 and utilized by the compositor 76 for performing alpha-blending.

Note that the foregoing examples pertaining to how the application 61 may utilize the configuration data 305 received from the application interface logic 300 have been described for illustrative purposes. Indeed, in other embodiments, the configuration data 305 may be indicative of other configuration characteristics of the graphical acceleration unit 95 and, in particular, the compositor 76, and the graphics application 61 may be configured to utilize other techniques in adapting its operation based on the configuration data 305.

Furthermore, it should also be noted that the operation of the compositor 76 can be generally controlled by the graphics application 61. For example, the application 61 may divide the image 221 to be displayed by the display device 83 into multiple portions 215–218 and then allocate each of the pipelines 55–58 to different portions 215–218, as described above. The graphics application 61 may then inform the compositor control logic 245 which portion 215–218 of the overall image 221 is allocated to each of the pipelines 55–58. Based on this information, the compositor control logic 245 then writes the appropriate graphical data into the output buffer 248 according to the techniques described above. Furthermore, the graphics application 61 can inform the compositor control logic 245 whether anti-aliasing, jitter enhancement, Z-buffering, and/or alpha-blending is to be performed by the compositor 76. Note that the graphics application 61 may communicate such control information through one or more of the pipelines 55–58 to the compositor 76, or the graphics application 61 may communicate such information to the compositor 76 via a connection 311 that bypasses the pipelines 55–58.

In addition, it is possible to distribute multiple graphics applications 61 or multiple threads of the same graphics application 61 across multiple pipelines 55–58 rather than having a single graphics application 61 provide graphical data to each of the pipelines 55–58, as is shown in FIG. 2. As an example, refer to FIG. 8, which depicts a plurality of graphics application threads 61a–61d that are each interfaced with one of the pipelines 55–58. Each of the graphics application threads 61a–61d may be implemented via a different host computer 103 (FIG. 3). Alternatively, if desired, each of the graphics application threads 61a–61d may be implemented via the same computer 133 that implements the application's corresponding pipeline 55–58. For example, FIG. 9 depicts a computer 133 utilized to implement one of the threads 61a and its corresponding pipeline 55. Note that other methodologies for implementing the graphics application threads 61a–61d and/or the pipelines 55–58 may be employed in other embodiments.

Figure 8:
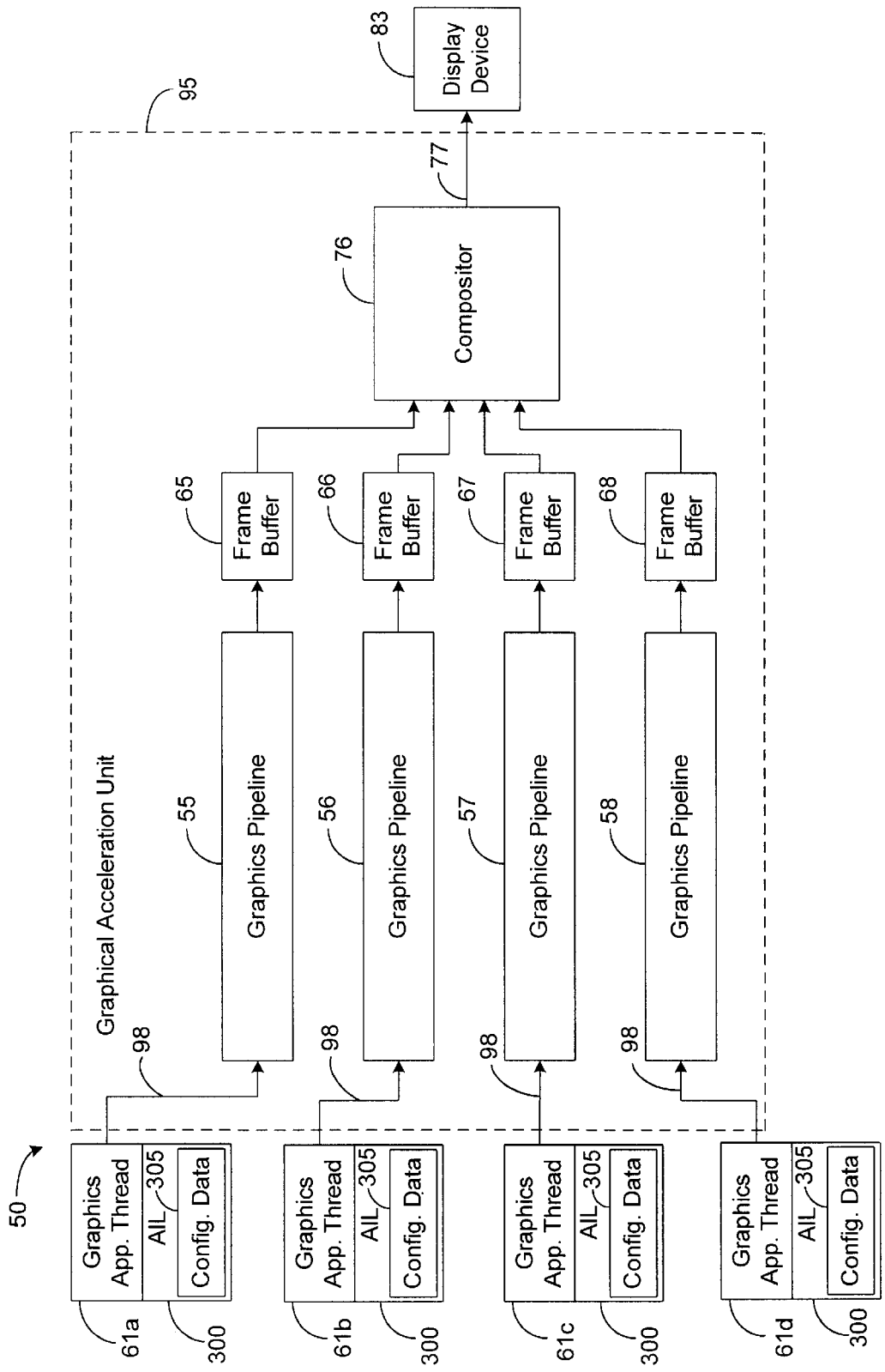
FIG. 8 is a block diagram illustrating another embodiment of the graphical display system depicted in FIG. 2.
Figure 9:
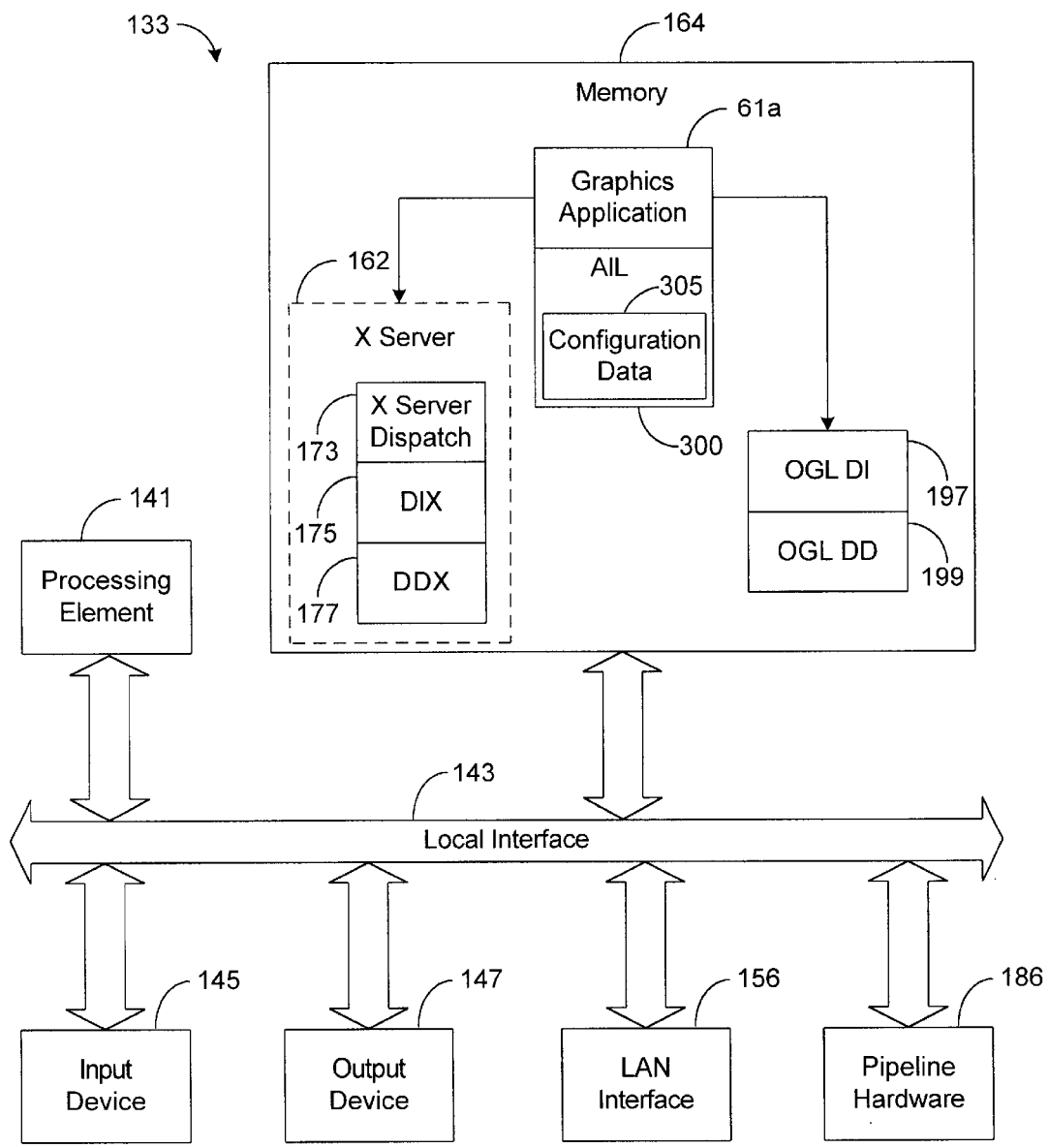
FIG. 9 is a block diagram illustrating a computer that may be utilized to implement a graphics application and a graphics pipeline such as is depicted in FIG. 8.

In the example shown by FIG. 8, each of the graphics application threads 61a–61d is interfaced with a different set of application interface logic 300. Each of the graphics application threads 61a–61d is configured to request its associated set of application interface logic 300 to query the configuration of the graphical acceleration unit 95 and, more particularly, the compositor 76. In response, the associated application interface logic 300 retrieves the configuration data 305 and provides the configuration data 305 to its respective graphics application thread 61a–61d. Each of the graphics application threads 61a–61d then adapts its operation based on the configuration data 305 via similar techniques described above for the embodiment depicted by FIG. 2. However, instead of providing each of the graphics pipelines 55–58 with graphical data, as is done by the graphics application 61 depicted in FIG. 2, each graphics application thread 61a–61d only provides its corresponding pipeline 55–58 with graphical data.

As an example, when the configuration data 305 indicates that the compositor 76 may perform screen space subdivision for four pipelines 55–58, each of the graphics application threads 61a–61d may be configured to allocate its corresponding pipeline 55–58, respectively, to a particular one of the image portions 215–218 (FIG. 5). More specifically, thread 61a may be configured to allocate its corresponding pipeline 55 to image portion 215, and thread 61b may be configured to allocate its corresponding pipeline 56 to image portion 216. Further, thread 61c may be configured to allocate its corresponding pipeline 57 to image portion 217, and thread 61d may be configured to allocate its corresponding pipeline 58 to image portion 218. Then, each of the graphics application threads 61a–61d provides its corresponding pipeline 55–58, respectively, with primitives only located in the image portion 215–218 allocated to its corresponding pipeline 55–58.

In FIG. 8, each set of application interface logic 300 stores its own set of configuration data 305. However, it is possible for multiple sets of application interface logic 300 to utilize the same set of configuration data 305. For example, a set of configuration data 305 may be stored in a memory location (e.g., in a database, in the compositor 76, in memory shared by one of the sets of logic 300, etc.) accessible by multiple sets of the application interface logic 300. Then, each of the multiple sets of application interface logic 300 may retrieve the configuration data 305 from the same memory location. Note that, in embodiments where multiple threads 61a–61d utilize the same set of configuration data 305, a single set of application interface logic 300 may be configured to provide the configuration data 305 to the multiple threads 61a–61d, if desired.

Note that one or more threads 61a–61d, similar to the graphics application 61 depicted in FIG. 2, may communicate, to the compositor 76, control information for controlling the general operation of the compositor 76. Such information may be transmitted via one or more pipelines 55–58 or via one or more connections 311 (not specifically shown in FIG. 8) that bypass the pipelines 55–58.

Figure 10:
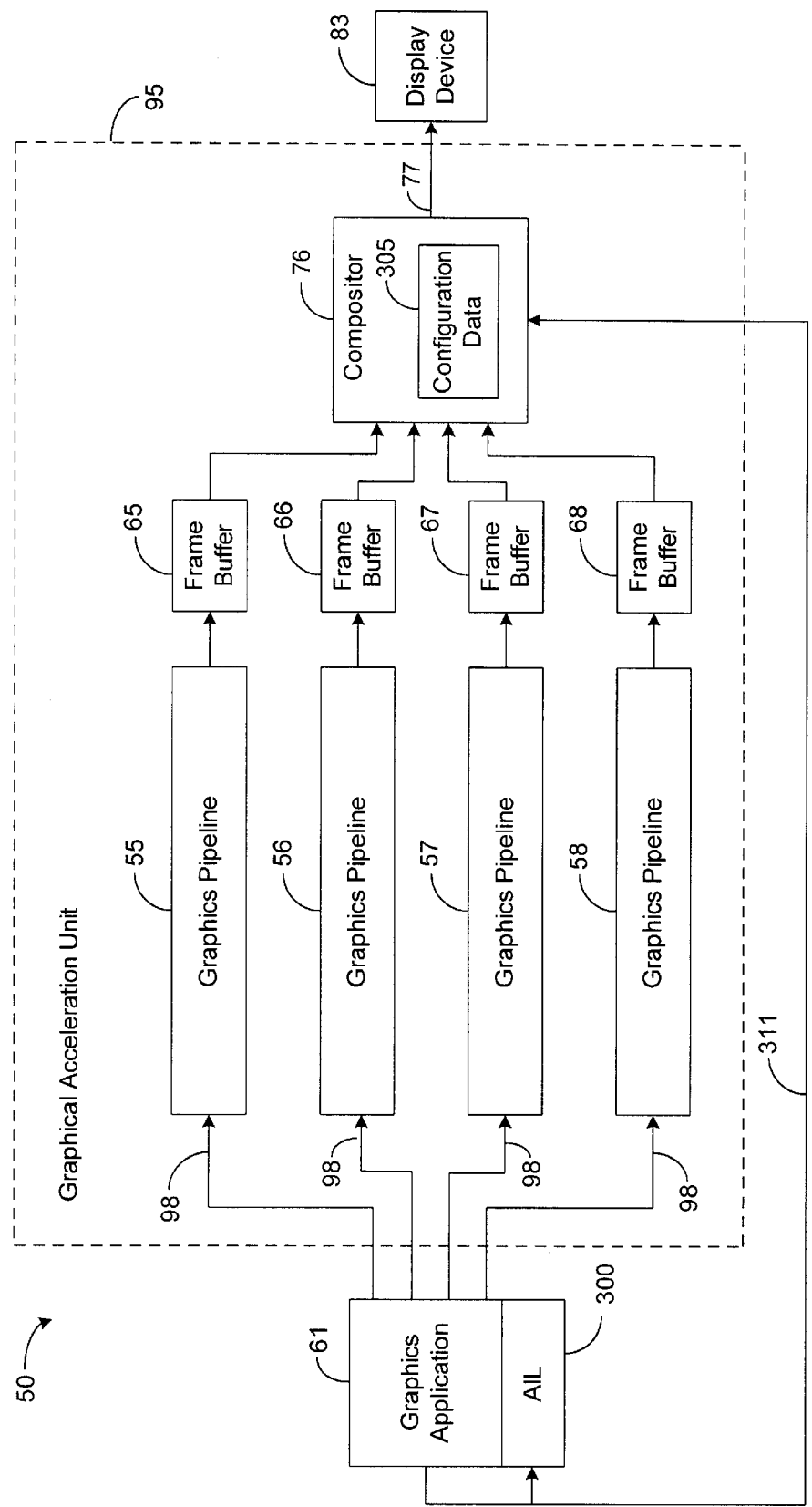
FIG. 10 is a block diagram illustrating yet another embodiment of the graphical display system depicted in FIG. 2.
Figure 11:
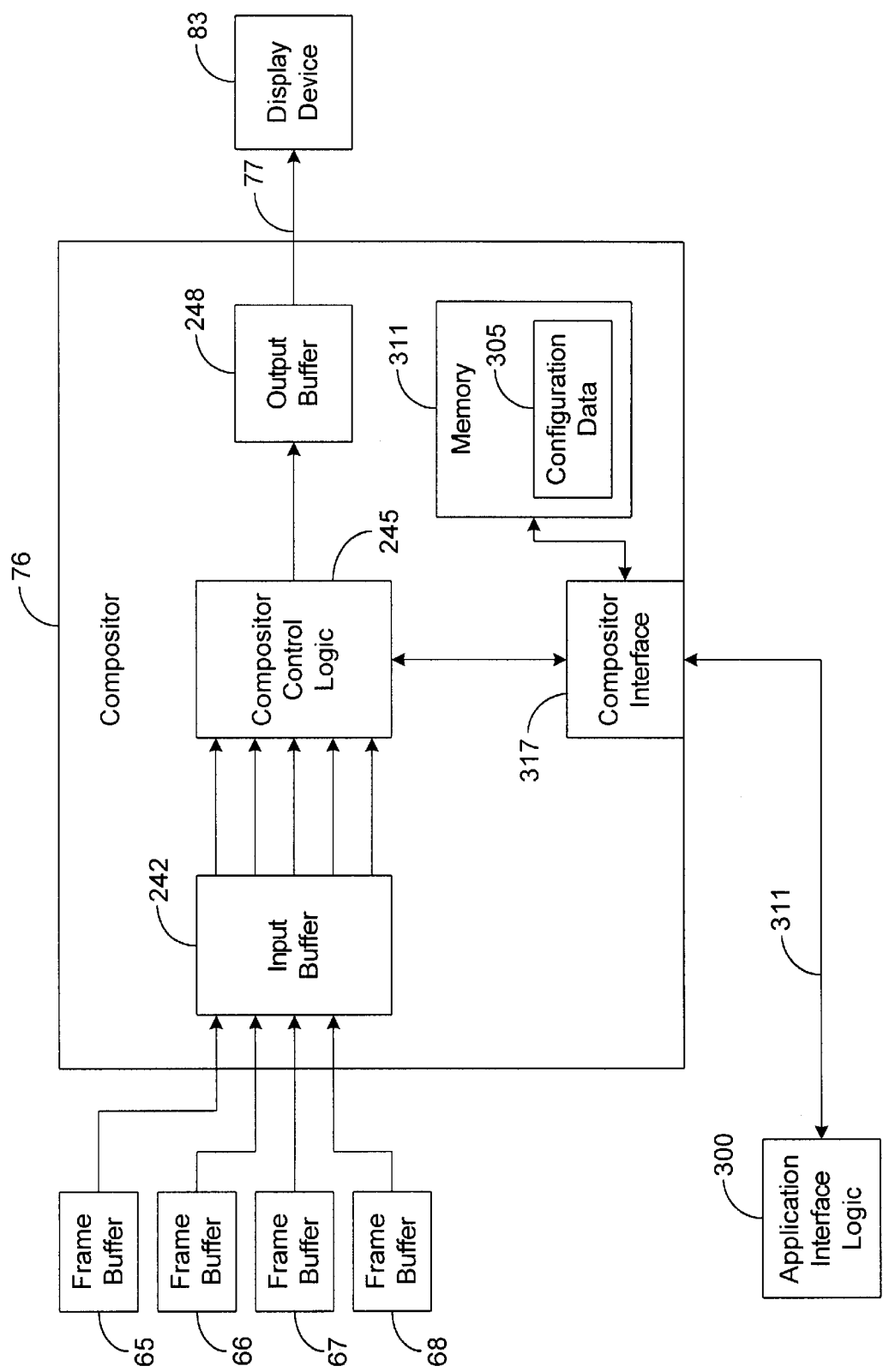
FIG. 11 is a block diagram illustrating a compositor such as is depicted in FIG. 10.

Further note that, as previously set forth above, the configuration data 305 may reside in various memory locations, such as in the compositor 76 or the computers 103 and 133 utilized to implement the graphics application 61 and/or one or more of the pipelines 55–58, for example. FIGS. 10 and 11 depict an embodiment where the configuration data 305 is stored within memory 311 (e.g., registers or other types of memory devices) of the compositor 76. In such an embodiment, the compositor control logic 245 (FIG. 11), the memory 311, and the compositor's buffers 242 and 248 may reside on one or more printed circuit boards (not specifically shown).

When the configuration data 305 resides within the compositor 76, as shown by FIGS. 10 and 11, the compositor 76 may comprise a compositor interface 317 for enabling data to be exchanged with the compositor 76. The compositor interface 317 may comprise any known or future developed communication device (e.g., RS-232 connector) for enabling data communication between the compositor control logic 245 and a device external to the compositor 76. In the embodiment depicted by FIG. 11, the compositor interface 317 is coupled to the application interface logic 300, which is configured to retrieve the configuration data 305 and to interface the retrieved configuration data 305 with the graphics application 61 (FIG. 2), as described hereinbefore.

Note that, according to the techniques described above, the graphics application 61 generally controls the operation of the graphical acceleration unit 95. In this regard, the graphics application 61 generally controls the allocation of the pipelines 55–58 and whether various image enhancement techniques (e.g., jitter-enhancement and/or anti-aliasing) are performed by the graphical acceleration unit 95. It should be noted that the graphics application 61 may change its control of the graphical acceleration unit 95 during operation (i.e., "on the fly").

For example, as the image displayed by the display device 83 changes, the graphics application 61 may change the allocation of the pipelines 55–58 in an effort to increase the efficiency of the unit 95 by keeping the amount of graphical data rendered by, each pipeline 55–58 substantially equal. In another example, the graphics application 61 may, if desired, dynamically change whether the unit 95 performs image enhancement techniques. Such a change may occur automatically or may occur in response to a user input command. Moreover, it may be desirable to change the allocation of the pipelines 55–58 as the application 61 changes the image enhancement techniques performed by the graphical acceleration unit 95.

As an example, two of the pipelines 55–58 may be allocated the same image portion for enabling the graphical acceleration unit 95 to perform jitter-enhancement on the image portion. If the graphics application 61 determines to end the jitter-enhancement, the graphics application 61 may allocate each of the two pipelines to different image portions in an effort to increase the rendering speed of the graphical acceleration unit 95. In any event, when the graphics application 61 dynamically changes the operation of the graphical acceleration unit 95, the graphics application 61, according to the techniques described herein, preferably utilizes the configuration data 305 to ensure that the operation of the unit 95 is changed in a manner consistent with the configuration of the unit 95.

By performing the techniques described herein, the graphics application 61 is capable of dynamically adapting its operation depending on the particular configuration of the graphical acceleration unit 95 and the compositor 76, in particular. Thus, the graphics application 61 is capable of efficiently operating in conjunction with graphical acceleration units 95 of different configurations.

Now, therefore, the following is claimed:

1. A graphical display system, comprising:
   a plurality of graphics pipelines configured to render graphical data in parallel;
   a compositor configured to define a composite data signal that is based on the graphical data rendered by each of the pipelines; and
   application interface logic configured to retrieve configuration data indicative of a configuration of the compositor, the application interface logic further configured to provide the configuration data to a graphics application,
   wherein the graphics application is configured to provide graphical data to the plurality of pipelines based on the configuration data.

2. The system of claim 1, further comprising a display device configured receive the composite data signal from the compositor and to display an image based on the composite data signal.

3. The system of claim 1, wherein the graphics application is configured to submit a request to the application interface logic, and wherein the application interface logic is configured to retrieve the configuration data in response to the request.

4. The system of claim 1, wherein the configuration data indicates whether the compositor is capable of performing a process selected from a group consisting of: screen space subdivision, anti-aliasing, jitter enhancement, Z-buffering, and alpha-blending.

5. The system of claim 1, wherein the configuration data is indicative of a number of pipelines interfaced with the compositor, and wherein the graphics application is configured to allocate a portion of an image to at least one of the pipelines based on the configuration data.

6. The system of claim 5, wherein the graphics application is configured to make a determination as to whether a primitive defining the image is within the portion allocated to the at least one pipeline and to determine whether to provide the primitive to the at least one pipeline based on the determination.

7. The system of claim 1, wherein the graphics application is configured to allocate each of the plurality of pipelines to a different image portion based on the configuration data.

8. The system of claim 7, where the graphics application is configured to dynamically reallocate at least one of the pipelines to a different image portion based on the configuration data.

9. The system of claim 1, wherein the graphics application is interfaced with the plurality of graphics pipelines via a local area network (LAN).

10. The system of claim 1, wherein the graphics application is configured to transmit drawing commands to each of the plurality of graphics pipelines.

11. The system of claim 1, wherein the configuration data is indicative of a number of the graphics pipelines interfaced with the compositor.

12. The system of claim 1, wherein the graphics application is configured to determine a number of the graphics pipelines that are interfaced with the compositor based on the configuration data and to allocate a task to at least one of the graphics pipelines based on the number.

13. The system of claim 1, wherein the graphics application is configured to allocate each of the graphics pipelines to a respective image portion based on the configuration data.

14. The system of claim 13, wherein the graphics application is configured to transmit a primitive to each of the graphics pipelines allocated to a respective image portion that is to display at least a portion of the primitive.

15. The system of claim 14, wherein the graphics application is configured to refrain from transmitting the primitive to at least one of the graphics pipelines allocated to a respective image portion that is not to display at least a portion of the primitive.

16. A graphical display system, comprising:
means for receiving graphical data from a graphics application and for rendering the graphical data in parallel;
compositing means for forming a composite data signal based on the graphical data;
means for storing configuration data indicative of a configuration of the compositing means; and
means for interfacing the configuration data from the storing means with the graphics application,
wherein the graphics application is configured to provide graphical data to the receiving and rendering means based on the configuration data.

17. A graphical display method, comprising the steps of:
providing graphical data from a graphics application to a plurality of graphics pipelines;
rendering the graphical data, in parallel, via the plurality of graphics pipelines;
utilizing a compositor to form a composite data signal based on the graphical data rendered by each of the plurality of pipelines;
retrieving configuration data indicative of a configuration of the compositor; and
adapting operation of the graphics application based on the configuration data.

18. The method of claim 17, further comprising the step of displaying an image based on the composite data signal.

19. The method of claim 17, further comprising the step of invoking the graphics application, wherein the retrieving step is performed in response to invoking step.

20. The method of claim 17, wherein the configuration data is indicative of a number of pipelines interfaced with the compositor, and wherein the method further comprises the step of allocating, via the graphics application, a portion of an image to at least one of the pipelines based on the configuration data.

21. The method of claim 20, further comprising the steps of:
determining whether a primitive defining the image is within the portion allocated to the at least one pipeline; and
determining whether to provide the primitive to the at least one pipeline based on the determining step.

22. The method of claim 17, further comprising the step of allocating each of the pipelines to a different image portion based on the configuration data.

23. the method of claim 22, further comprising the step of dynamically reallocating at least one of the pipelines to a different image portion.

* * * * *